Sept. 3, 1940.  J. F. BOYLE  2,213,878
VALVE MECHANISM
Filed Feb. 26, 1935  2 Sheets-Sheet 1
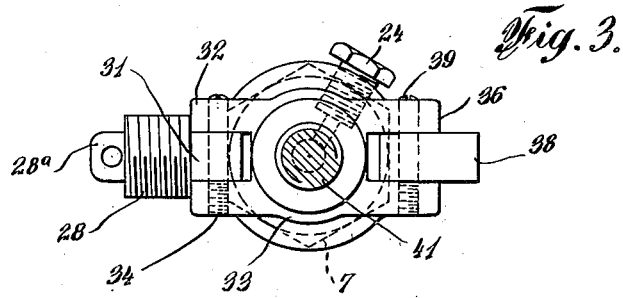
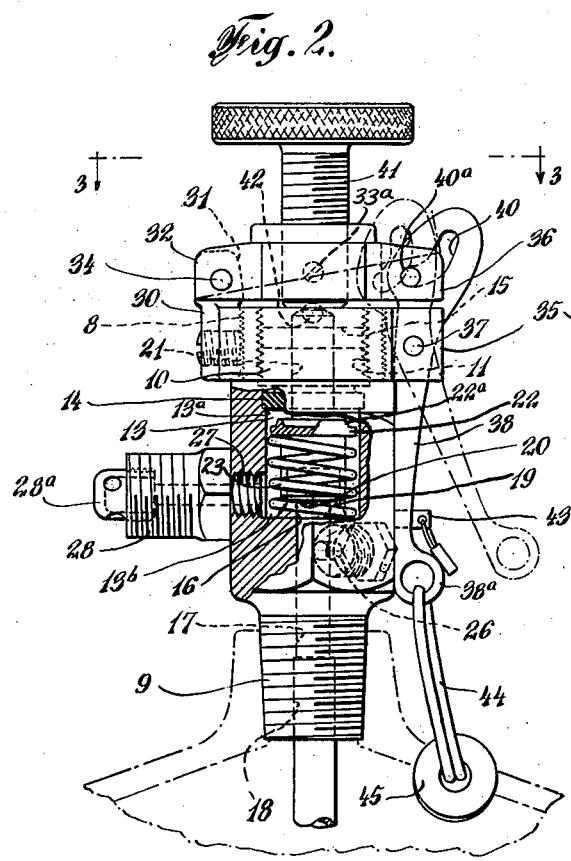
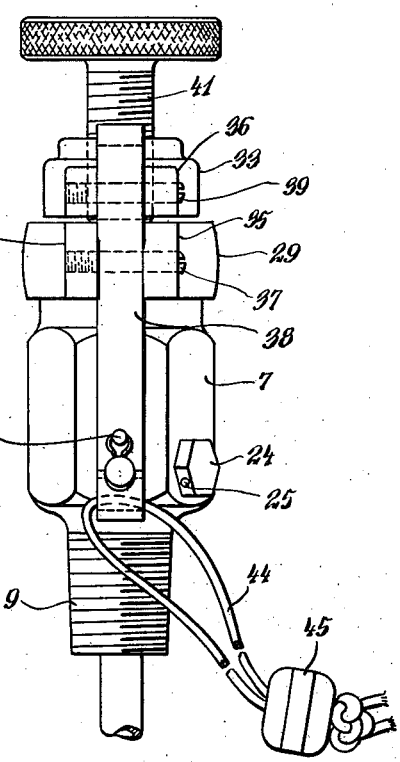
INVENTOR
James F. Boyle
BY
ATTORNEY Sept. 3, 1940.  J. F. BOYLE  2,213,878
VALVE MECHANISM
Filed Feb. 26, 1935  2 Sheets-Sheet 2

INVENTOR
James F. Boyle
BY
P. Frank French
ATTORNEY

Patented Sept. 3, 1940

2,213,878

UNITED STATES PATENT OFFICE 2,213,878

VALVE MECHANISM

James F. Boyle, Teaneck, N. J.

Application February 26, 1935, Serial No. 8,267

5 Claims. (Cl. 221—73.5)

This invention relates generally to valve mechanisms and is more particularly directed to a mechanism connectable to a tank or container for fluid under pressure, and capable of manual or automatic actuation to permit fluid to discharge therefrom, the valve mechanism being so constituted that the tank or container may be recharged or refilled therethrough, thus rendering it applicable to the tank or container as a permanent fixture or component thereof.

While my invention, as hereinafter will become manifest, possesses a wide range of application to containers of liquid and gases under high and low pressures, for the purposes of this disclosure, I have elected to describe it, as it may be employed in conjunction with tanks or containers, commonly styled cylinders and bottles, for carbon-dioxide or other fluids, that are designed to be liberated or discharged for the performance of the work to which they are to be applied, at pressures ranging from 800 lbs. to 1,500 lbs. and upwards, to the square inch. It will be understood, however, that the confining of my description to the use of my invention with $CO_2$ containers, for example, is merely illustrative and is not to be construed, in any sense, as a limitation of the scope of its utility.

As is well known, carbon-dioxide, retained in suitable containers, is utilized for inflating flotation bags and other forms of inflatable emergency equipment in aircraft operation, principally, because of its almost instantaneous effectiveness in doing the work to which it is directed, which flows from its chemical characteristics and the relatively high pressures under which the discharge takes place. Also, because of these same attributes, carbon-dioxide is extensively used in fire-extinguishing apparatus, as the portable tanks, superseding carbon-tetrachloride to a large degree. The $CO_2$ containers, as marketed, are sealed with an element, which, while it is resistant to the variable pressures of the contained fluid, the pressure fluctuating in response to external temperature changes, is susceptible of rupture or breakage under the application of a force produced by mechanical or manual effort.

In existing types of valve mechanisms, the rupture of the tank sealing element is relied upon to bring about the discharge of the fluid, the mechanism embodying a seal cutting or puncturing surface which is rendered effective in response to a rotative movement of the actuating means, as a coacting valve stem or other media rotatable by the operation of a pull lever or handle. The patent to Mapes, No. 1,781,854 granted November 18, 1930, is an example of the fire-extinguisher type of valve having a cutter for the frangible seal and a co-acting rotatable valve stem for actuating the cutter. Various substantially similar disc rupturing valve mechanisms, modified to permit of their so-called remote operation, have been devised for inflation purposes. However, none of these prior art devices have been found to be entirely satisfactory. For instance, as will be obvious, constructions such as Mapes discloses, with their screw type mode of operation are relatively slow in functioning and are intended only as gas discharging media, it being necessary to remove the valve mechanism from the container in order to refill the latter. The same disadvantages are inherent to the remotely operated types. In fact, in the latter, because of the necessity of translating a pull into rotative movement to perform the seal rupturing operation, considerable manual effort is required and, in addition, as will be apparent, in order to obtain the requisite rotative movement, the length of the pull must be proportionately greater. When the installation conditions make the use of a multiplicity of pulleys or guides necessary between the pull handle and the tank, there will be greater manual effort required with a concomitant increase in the possibility of sluggish operation. Manifestly, the so-called long pull actuated mechanisms do not and cannot respond to the need for simple and instantaneous operation, in the use of emergency equipment, apart from other limitations that they possess, as hereinbefore pointed out.

Therefore, the primary object of the present invention is to provide a simple and highly efficient valve mechanism, adapted for use in conjunction with various types of fluid tanks and containers, whereby those disadvantages which are inherent to prior mechanisms and their mode of operation are eliminated.

A further object of this invention is to provide a valve mechanism for containers and the like, which, at the option of the user, may become, in effect, a permanent component or part thereof, the mechanism being susceptible of being conditioned to admit of the container being charged therethrough, as well as being functioned for the discharge of the container contents.

It is also an important object of my invention to provide a valve mechanism, possessing the aforesaid characteristics and advantages, in which instantaneous emission of the contents of the container to which it is applied, is obtained, this being accomplished in response to a single unidirectional movement, whereby the mechanism is conditioned for the discharge.

Another important objective of my invention is to increase the factor of safety in the use of high pressure tanks and containers, especially of the types referred to, my valve mechanism not only providing a more positive seal at the normal fluid pressures, but insuring the maintenance of the seal under those higher pressures which may be induced by a rise in the external temperature, the fluid pressure being utilized in creating reacting forces to attain this result in the functioning of my mechanism.

More specifically, it is the object of this invention to obtain greater economy and more efficiency in the use of carbon-dioxide tanks and containers in their various spheres of utility and also to obviate the possibility of leakage or accidental discharge of the fluid, with the attendant hazards.

Other objects and advantages flowing from the practicing of my invention will doubtless become manifest as the description proceeds and I would have it clearly understood that I reserve unto myself all rights to the full range of equivalents, both in structure and in use, to which I may be entitled under my invention in its broadest aspect.

In the accompanying drawings, I have shown certain preferred embodiments of my invention, such as may be employed in the use of carbon-dioxide tanks or containers as fire extinguishers or as the source of supply for the inflation of emergency aircraft equipment. However, my invention may take other forms in adapting it to these specific uses and in rendering it applicable to containers of other fluids or gases designed to be discharged or liberated under pressure, within the purview of the appended claims.

In the drawings:

Figure 1 is a view in elevation of a valve mechanism conforming to my invention, which is primarily adapted to use in conjunction with fire-extinguishers and similarly used fluid containers.

Figure 2 is a sectional elevation of the structure shown in Figure 1.

Figure 3 is a top plan view, taken on the line 3—3 of Figure 2.

Figure 5:
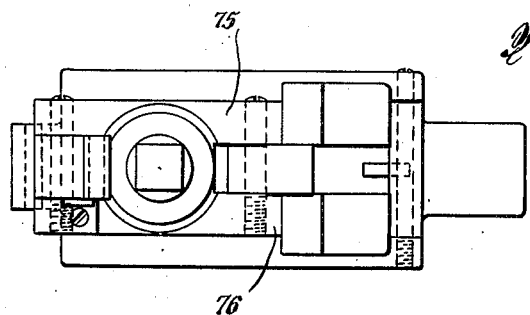
Figure 5 is a top plan view of the structure of Figure 4, with the cover or closure removed.

Referring now to the drawings in detail, in which like characters of reference are employed to designate similar parts in the several views, and more particularly to the structure of Figures 1 to 3, inclusive, 7 indicates the mechanism housing, preferably of the shape shown, including an intermediate hexagonal body-portion and upper and lower ends of relatively reduced diameter, externally threaded as at 8 and 9, it being obvious that the lower end, which is tapered, is designed for the threaded connection of the housing to the outlet or neck of a fluid tank or container, either directly, or through the medium of a suitable bushing or coupling.

The housing 7 is provided with a longitudinal bore, the diameter of which varies in different zones throughout its length, the portion 10, within the upper end of the housing, threaded, as at 11, being of major diameter. The section next below the portion 10, which forms a valve chamber or cage 13 is of a reduced diameter, the upper edge of the wall thereof providing a ledge or shoulder 13a which functions as a support for a centrally apertured washer or disc 14 of yieldable or resilient material, the said washer or disc being frictionally held between said shoulder and the nut or plug 15 threaded into the bore portion 10, for the purposes, which, hereinafter, will become apparent. Below the valve chamber 13, the bore is further constricted to form a passage 16 of relatively small diameter communicating with the chamber 13 and with the bore sections 17 and 18, which are respectively sized to receive the end of the usual siphon tube, the section 17 being threaded to engage with the threads of the reduced diameter nipple-forming end of said tube.

As will be observed, the passage 16, at its upper end, terminates within the area of the valve chamber 13 in a valve seat 19 formed by undercutting the surrounding base of said chamber, as at 13b, the seat tapering upwardly to coact with the valve 20 to form a seal for the passage 16, the seat-engaging surface of the valve being larger in diameter than the seat and preferably formed with a recess complemental to the contour of the cooperating portion of the seat, within which the latter is entered in the sealing operation, as will be explained.

Included in the fitting embodying the valve 20 and the valve stem 21, reciprocable in the bearing provided in the plug or nut 15, is a second valve 22, intermediate of the valve 20 and the head of the stem 21, the valve 22 being substantially of the same diameter as the chamber 13. This valve 22, in conjunction with the aforesaid washer 14, is designed to seal the upper end of the valve chamber, the face of the valve being undercut to provide an upstanding ring 22a spaced inwardly of its periphery which is urged into close association with the coacting yieldable washer under the influence of the expansion spring 23, surrounding the valve fitting below the valve 22 and in bearing engagement with the underside of the latter and the base of the valve chamber 13.

Communication between the passage 16 and the atmosphere external of the housing is provided for by a radially disposed bore into which a plug 24 having an axial bore with a right angularly directed vent 25 leading therefrom to the exterior of the plug, is threaded, a disc of gold or other suitable material, indicated at 26, frangible at a predetermined internal pressure being interposed between the inner end of the plug 24 and a cooperating shoulder formed in the housing bore. Obviously, this construction provides a safety vent to eliminate the dangers of excessive tank pressures, the disc resisting rupture within the range of normal pressures. A second radial bore 27, leading from the valve chamber 13 to the outside of the housing 7 is internally threaded for the reception of the nipple 28, sealable by the plug 28a, which may function as a direct outlet, or as a means of connecting the mechanism to a charging or discharging line.

A collar 29, internally threaded to engage the upper end 8 of the housing 7, preferably embodies a peripheral boss 30 which is continued upwardly above the rim of the collar to provide a lug 31 to which the clevis end 32 of the head-forming yoke 33 is pivoted or hinged, as by the connecting screw or pin 34. Diametrically opposite to the boss 30, the collar 29 is provided with laterally spaced peripheral extensions or ears 35, upon which the members constituting the bifurcated end 36 of the yoke 33 abut when the latter is superposed upon the collar 29. Mounted for pivotal movement between these extensions 35, on the axis of the connecting screw 37, is a lever 38, the latter embodying an enlarged head which is entered in the bifurcated end 36 of the yoke 33, the lever and yoke being interconnected for relative movement through the medium of the yoke-end spanning screw or pin 39 and the cooperating elongated curved slot 40 in the lever head, the line of curvature of said slot, adjacent its lower end, departing from that of a true arc to provide a substantially horizontal terminal portion 40a for the purposes which will become apparent.

The body of the yoke 33, as will be noted, is centrally bored and threaded to receive the valve adjusting screw 41, the lower end of which is formed with a semi-spherical recess, within which the complemental surface of the juxtaposed end of the stem 21, provided by the ball 42 seated in the latter, is adapted to enter in the functioning of the screw.

Assuming that it is desired to charge the container (indicated in dotted lines in Figure 2), to which the valve mechanism is connected, the adjusting screw is rotated anti-clockwise sufficiently to clear the valve stem and permit the spring 23 to expand and urge the valve 22 toward the washer 14 so that the surface 22a of the valve will coact therewith to seal the housing bore above the valve chamber 13, it being obvious that, simultaneously with the sealing of the chamber 13, communication is established between the radial bore 27 and the container by the unseating of the valve 20. The container may now be charged by connecting the nipple 28 to a source of fluid supply, the fluid entering the container past the unseated valve 20.

In the conditioning of the mechanism for functioning as a seal for the container, the lever 38 is associated with the housing pin 43, the latter entering and protruding through the registering lever aperture 38a, to locate the pin or screw 39 within the complemental lower end 40a of the lever slot 40. As will be noted from Figure 2, the screw or pin 39 carried by the yoke end 36 is offset slightly to the left or toward the yoke body, relatively to a perpendicular line intersecting the center of the lever fulcrum 37 carried by the collar extensions 35. Therefore, when the lever is positioned as described, with the pin 39 located in the slot portion 40a, the yoke and collar will be interlocked, with the bifurcated end 36 of the former abutting upon the collar extensions 35, it being manifest that this will result from the disposition of the bearing end 40a of the lever slot and the concentrically located pin 39, inwardly of the fixed axis of rotative movement of the lever 38.

With the yoke and collar interlocked, the screw 41, which may be locked against actuation by the set screw 33a in the yoke body, is rotated clockwise to engage the valve stem 21 and depress the valve element in opposition to the spring 23 to seat the valve 20 and close communication between the container and the outlet bore 27, the valve 22, of course, being coincidentally unseated. It will be evident that with the seating of the valve 20, the valve element with its integral stem 21 and the screw 41 abutting thereon, will provide a rigid line of resistance to the counter forces of the confined fluid pressure and the compressed spring 23, the upward pressure transmitted to the yoke tending to urge the free end of the lever 38 toward the housing, because of the disposition of the pin 39 relative to the axis of the lever fulcrum 37, as previously pointed out, thereby adding to the security of the seal and eliminating the hazards of leakage of the fluid as the pressure varies under normal use conditions. On the other hand, the method of interconnecting the yoke and lever for relative movement, in addition to providing for the interlocking of these components of the assembly with the cooperating collar and housing, as described, also permits of the unseating of the valve 20, for liberating the fluid for the performance of the work to which it is to be applied, in response to a short or slight movement of the lever to effect its disengagement from the pin 43. This may be accomplished by grasping the lever end, which may embody a surface for the purpose, or by means of the pull-cord 44 connected to the lever eye 38a and attached to the hand grip 45, or other suitable media adjacent to or remote from the container and valve mechanism, the initial movement of the lever rocking it on its fulcrum 37 so that the screw or pin 39 assumes a position in the lever slot 40, whereby the upwardly directed forces will instantly become effective to unseat the valve 20 and close the upper end of the valve chamber 13, the yoke 33 moving on its hinge 34 as the pin 39 is relieved of the restraining effort at the bearing end 40a of the slot and traverses the arcuate portion of the latter to throw the lever into its extreme non-effective position, as shown in dotted lines in Figure 2. In other words, by the use of my construction the same means which function to secure the seal against fluctuating pressures and accidental leakage, are effective in obtaining instantaneous discharge of the confined fluid, in response to an instantly performable conditioning operation.

Figure 4:
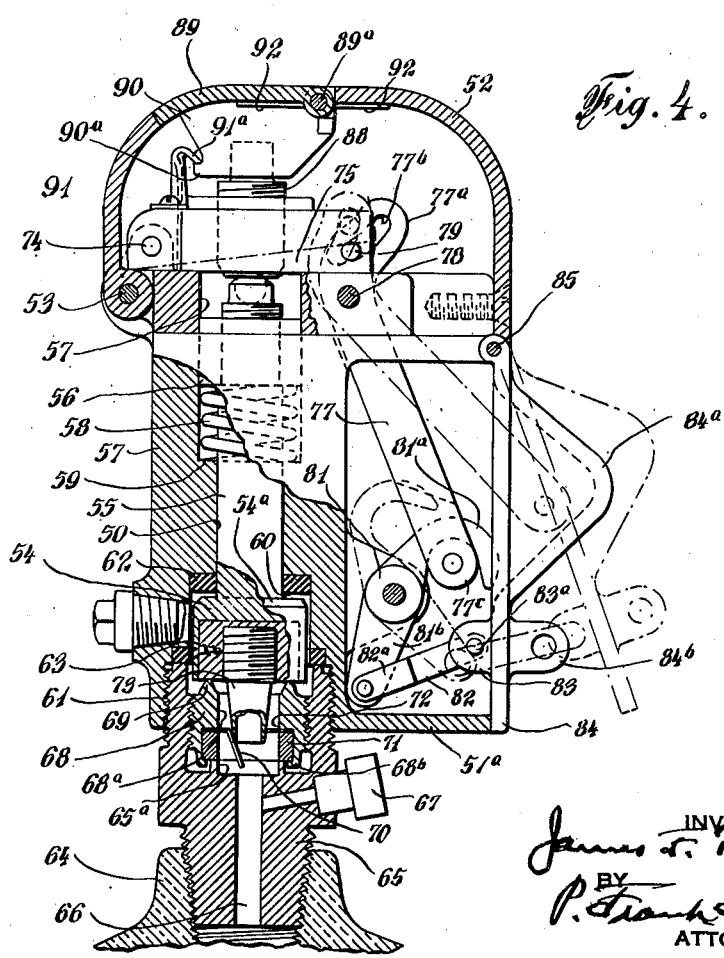
Figure 4 is a sectional elevation of a form of my invention designed for operation at a point distant or remote therefrom, as in the use of inflatable equipment.

In the form of the invention shown in Figures 4 and 5, the valve unit, reciprocable in the longitudinal bore 50 of the housing 51, embodying an offset or lateral extension 51a and a hood 52 hinged thereto, as at 53, includes the valve element 54 and the integral stem 55, the upper end of which is threaded to enter the nut 56 fitted in the enlarged upper section 57 of said bore, which forms a bearing therefor. A spring 58 is supported on the valve stem between said nut 56 and the shoulder 59 which defines the upper end of the intermediate constricted zone of the housing bore which functions as the valve stem guide, the bore below this guide-forming zone being enlarged in two diameters, as 60 and 61, the valve element 54, embodying the upstanding rim 54a integral with its upper surface adapted to cooperate with the washer of disc 62 being housed within the bore section 60, as will be seen from Figure 4. Communicating with the latter bore section is a passage 63 threaded to receive a sealing plug or a connection to a line for delivering the fluid to the point at which it is to be utilized, for example, at a point remote from the container and associated valve mechanism, as where carbon-dioxide is employed as the agent for inflating emergency landing gear for aircraft.

The container neck or outlet 64 is threaded to receive the usual bushing 65, bored as at 66 and having a disc-sealed safety vent 67, corresponding to that previously described. As will be noted, the bore 66 is enlarged at its upper end and threaded to receive the reducer 68 which includes a valve seat 69 adapted to cooperate with the valve 54 to seal the passage 68a through the reducer and the constricted portion of the bushing bore 66 which is a virtual downward continuation thereof, as defined by the bushing and reducer surfaces 65a and 68b. The bushing 65 is externally threaded, the internal threads of the housing bore section 60 meshing therewith in the mounting of the valve mechanism upon the container, as shown, so as to locate the valve seat 69 in juxtaposition to the valve with which it is designed to cooperate.

The container is originally sealed by a frangible metal disc 70 frictionally retained between a collar 71 and the internal shoulder 72 of the reducer 68, the collar being confined between said shoulder and the aforesaid reducer surface 68b as a component of the valve seat unit. As will be observed, a hollow tapered stem 73 depends from the valve element, centrally of the valve-forming surface thereof, which is provided with a cutting edge to function in rupturing or cutting away the aforesaid sealing disc 70 when the valve mechanism is connected to the container, as hereinafter explained.

Appropriately hinged to the upper end of the housing, as at 74, is a yoke 75 having a bifurcated end 76 to receive the head 77a of the lever 77 fulcrumed in the housing, as at 78, the lever head being formed with a curved slot 77b, as in the structure of Figures 1 to 3, within which the yoke-end spanning pin or screw 79 travels, the axis of the latter being offset slightly outwardly of the center line of the fulcrum-forming pin 78.

Rockably mounted in suitable bearings within the housing, as at 80, is a lever 81 embodying a hook end 81a, which is adapted to enter the longitudinally slotted lower end of the lever 77, for engagement with the roller 77c thereof, the other end of said lever 81 being connected by a link 82 to a plate 84 hinged to the housing as at 85. This link embodies a clevis pivotally connected to the lever end 81b, as at 82a, the other end of said link pivoting between the lugs 83, on the pin 83a. The plate 84 which functions as a door or closure for the open side of the housing section or extension 51a, includes a well or recess defined by the external surface 84a to accommodate the lower end of the lever 77 when the plate is actuated, through the medium of a flexible cable or other means attached to the pin or lug 84b thereon, as hereinafter described.

As in the structure of Figures 1 and 3, the yoke 75 carries a valve element adjusting screw 88, shouldered to receive a wrench, the lower end thereof being recessed complementally to the semi-spherical end of the valve stem 55 upon which it is adapted to bear when rotated clockwise to depress the stem and urge the valve element into association with the seat 69 at the upper end of the reducer bore 68a.

The frangible metal disc 70, contained within the reducer 68 threaded into the bushing 65, which, in turn, is threaded into the neck of the container, constitutes the original seal for the charged vessel. Therefore, when the valve mechanism is associated with the bushing, as shown in Figure 4, and the valve element pressed toward the seat 69, the dependent tapered stem 73 impinges upon the disc 70 and coincidentally with the seating of the valve effects its rupture, thereby establishing communication between the container and the valve seat 69. Of course, similarly to the form of the invention previously described, the yoke 79 is engaged in the lower end of the lever slot 77b, this, in the present instance, being effected when the lever 77 is poised for the engagement of the hook 81a with its slotted end, which occurs when the lever 81 is rocked on its fulcrum in response to the movement of the plate 84 to its closure-functioning position. Obviously, as the pressure upon the valve element is increased by the clockwise turning of the screw 88 in the seating of the valve, the reacting forces transmitted to the yoke 75 will tend to urge the roller 77c into more intimate association with the embracing hook 81a and proportionately add to the security of the seal obtained by the coacting valve element and seat 69.

The hood or bonnet 52 is cut away at the top to form an opening which is covered by a conforming section 89 hinged to the hood, as at 89a. This section carries a signal or indicator element 90 fixed to its underside, which embodies a lip 90a adapted for engagement by the hook 91a of the upstanding latch-piece 91, a spring 92 being associated in the hinge assembly to urge the section upwardly. Therefore, when the bore has been closed at the seat 69, as just described, the hood or bonnet may be locked to the housing by the screw 52a, the bonnet section 89 being depressed to merge into the peripheral contour of the hood and engage the lip 90a of the signal element beneath the hook 91a of the latch-piece which is sufficiently flexible for the purpose.

Now, to liberate the contents of the container into the outlet bore 63, the plate or closure 84 is pulled outwardly, as by means of a hand grip connected to a cable attached to said plate as heretofore explained, which may be in proximity to said housing or at a point remote therefrom. The outward swing of the plate 84, through the medium of the interconnecting link 82 produces a concurrent movement of the lever 81 to throw the hook 81a upwardly, the upward pressure of the fluid against the valve element and the reaction of the spring 58, compressed between the nut 56 and the bore shoulder 59 when the valve element is engaged with the seat 69, accelerating the release of the lever 77 from the hook 81a following the actuation of the hook to a non-effective position by the initiation of the plate movement by the tug upon the cable. Manifestly, as in the embodiment of Figures 1 and 3, this is due to a component of force upon the yoke pin 79, which is a product of the upward pressure upon the valve element, that is transmitted to the pin by the contour of the lever slot 77b and the disposition of the pin relatively to the lever fulcrum 78.

With the release of the lever 77, the yoke is urged upwardly on its pivot 74 which, as will be evident, will cant the latch-piece 91 to release the signal element and permit the spring 92 to function to rotate the hood section 89 to display the signal element externally of the hood. Obviously, as in the structure of Figures 1 to 3, coincidentally with the unseating of the valve element to establish communication between the container and the outlet 63, the bore above the valve element and said outlet is sealed by the engagement of the valve element with the upper seat formed by the washer or disk 62, this latter disposition of the valve element also admitting of the utilization of the outlet for connecting the mechanism to a charging line, whereby the container may be refilled therethrough, the valve element being reengaged with the seat 69 at the conclusion of the charging operation, in the manner previously explained. If desired, as will be readily seen, the mechanism, instead of remaining a permanent part of the container to which it is originally applied, for use in controlling both the charging and discharging thereof, may be detached following the initial discharge for application to another frangible disc-sealed vessel, the tapered disc-cutting stem functioning to rupture or break the seal in the conditioning of the mechanism for obtaining a substantially instantaneous discharge of the container contents.

From the foregoing, it will be manifest that I have attained the objectives to which my invention is directed in an extremely practical and highly efficient manner, all of the hazards which are associated with the use of existing forms of valve mechanisms used in conjunction with containers for carbon-dioxide and other fluids confined at relatively high normal pressures being entirely eliminated. Further, the operation of the mechanism is substantially instantaneous in obtaining the discharge of the container contents and is accomplished by a single short range movement of the valve releasing means, either at the mechanism itself or distant therefrom. In other words, the connection of the mechanism to the container or tank conditions the latter for the discharge of the contained fluid in response to the unseating of the bottom valve face which is instantly effected by the fluid pressure supplemented by the spring action, when the locking means are dislocated by the slight movement essential therefor.

While I have described my invention more or less in detail, with reference to the embodiments shown, it will be evident that changes in the structure of the housing may be made and that the assembly of the mechanism may be varied to meet different requirements of production and use, without departing from the spirit and scope thereof, as defined by the claims.

I claim:

1. A valve mechanism having a housing, provided with a longitudinal bore embodying a valve chamber, an outlet from said housing communicating with said chamber, a valve element located in said chamber, a valve seat above said outlet, a valve seat below said outlet, said element being adapted to cooperate with either of said seats, means rotatable relatively to said element for urging said element into engagement with the lower valve seat, resilient means between the valve seats for associating said element with the upper valve seat and means for conditioning said rotatable means to render it effective, said conditioning means being actuatable to urge said element toward said upper seat for sealing the bore above said outlet and coincidentally open communication between the lower seat and said outlet.

2. A valve mechanism having a housing formed with a central bore provided with valve seats in superposed relation, a valve element mounted in said bore adapted to cooperate with either of said seats to seal the bore above said element, an outlet from said bore between said valve seats, resilient means between said seats effective on said valve element to seal the bore above said outlet, positively actuatable means adjustable relatively to said element for rendering said element effective in sealing said bore below said outlet, a support for said means hinged to said housing and a device non-detachably connected to said support for relative movement for locating said support in a predetermined position for the functioning of said adjustable means, said device being operable for establishing communication between said outlet and the bore therebelow.

3. A valve mechanism for containers for fluid under pressure, embodying a housing formed with a longitudinal bore provided with relatively spaced valve seats, a passage from said housing to the external atmosphere, said passage communicating with said bore between said valve seats, a valve element reciprocable within said bore formed to coact with either of said seats, resilient means associated with said element between said two seats for seating said valve element above said passage, a member hinged to said housing in superposed relation to said bore, a screw threaded therein for separable engagement with said valve element, a lever fulcrumed on said housing, means non-detachably connecting said lever to said member for relative movement, said means being adapted to interlock said member with said housing in response to a predetermined disposition of said lever relative to said housing whereby said screw may be actuated to depress said valve element for engagement with the seat below said passage and means for rocking said lever to render said interlock ineffective, said valve element being urged from its seat below said passage by forces applied thereto axially of the bore.

4. A valve mechanism for containers for fluid under pressure, embodying a housing formed with a longitudinal bore provided with relatively spaced valve seats, a passage leading from said bore between said seats to the exterior of said housing, a valve element reciprocal within said bore formed to coact with either of said seats, resilient means between said valve seats, effective for seating said element above said passage, a member hinged to said housing in superposed relation to said bore, a screw threaded therein adapted for engagement with said valve element, a lever fulcrumed on said housing, means of connection between said lever and said member, said latter means comprising relatively shiftable interconnected surfaces engageable to interlock said member to said housing in response to a predetermined disposition of said lever whereby said screw will be alined with the axis of said valve element, for actuation to seat said element below said passage, and means for rocking said lever to relatively dislocate said interconnected surfaces from their interlocking positions, to permit of the unseating of said valve element to establish communication between said passage and the container, the bore above said passage being sealed by the association of said element with the seat above said passage.

5. A valve mechanism for containers for fluid under pressure, embodying a housing having a longitudinal bore formed with relatively spaced valve seats, a valve element reciprocable within said bore formed to coact with either of said seats, a passage from said bore to the exterior of said housing communicating with the former intermediate of the valve seats, resilient means associated with said element between said seats for seating said valve element above said passage, a member hinged to said housing, positively actuatable means carried by said member for urging said element into functioning cooperation with the seat below said passage and a lever non-detachably connected to said member for relative arcuate movement, adjustable relatively to said housing to render said positively actuatable means effective on said valve element to maintain the seal in opposition to forces applied to said element axially of said bore, said positively actuatable means being rendered non-effective relatively to said element in response to a single movement of said lever, whereby said valve element will be actuated by said forces to establish communication between said passage and the bore therebelow and close communication between said passage and the bore thereabove.

JAMES F. BOYLE.